(12) United States Patent
Hosotani

(10) Patent No.: US 11,989,608 B2
(45) Date of Patent: *May 21, 2024

(54) ELECTRONIC CARD WITH BIOMETRIC AUTHENTICATION FUNCTION

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/061,314

(22) Filed: Dec. 2, 2022

(65) Prior Publication Data

US 2023/0095548 A1 Mar. 30, 2023

Related U.S. Application Data

(63) Continuation of application No. PCT/JP2021/004029, filed on Feb. 4, 2021.

(30) Foreign Application Priority Data

Jun. 5, 2020 (JP) .................. 2020-098102

(51) Int. Cl.
G06K 19/073 (2006.01)
(52) U.S. Cl.
CPC .............. *G06K 19/07354* (2013.01)
(58) Field of Classification Search
CPC .............................................. G06K 19/07354

(Continued)

(56) References Cited

U.S. PATENT DOCUMENTS 10,339,520 B2 * 7/2019 Wyatt .................. G06Q 20/341
11,755,873 B1 * 9/2023 Finn ................. G06K 19/07749
235/492

(Continued)

FOREIGN PATENT DOCUMENTS

| JP | 5013019 B1 | 8/2012 |
|---|---|---|
| JP | 2012-238126 A | 12/2012 |
| WO | 2017/145879 A1 | 8/2017 |

OTHER PUBLICATIONS

International Search Report issued in PCT/JP2021/004029; dated May 11, 2021.

*Primary Examiner* — Allyson N Trail
(74) *Attorney, Agent, or Firm* — Studebaker & Brackett PC

(57) ABSTRACT

An electronic card with biometric authentication function includes a communication antenna for short-range wireless communication, a wireless communication IC, a receiving coil, a resonant capacitor, a rectifying and smoothing circuit, a biometric sensor, and a biometric authentication circuit. The communication antenna and the receiving coil respond to a magnetic field in the same frequency band for the short-range wireless communication. The wireless communication IC performs short-range wireless communication. The receiving coil receives power from the magnetic field in the same frequency band for the short-range wireless communication. The biometric authentication circuit causes the biometric sensor to operate by using the power received from the receiving resonant circuit. The communication antenna and the receiving coil share electromagnetic field energy resonating in the same frequency band for the short-range wireless communication, the electromagnetic field energy being shared because of magnetic coupling between the communication antenna and the receiving coil.

20 Claims, 16 Drawing Sheets

(58) Field of Classification Search
USPC .......................................................... 235/492
See application file for complete search history.

(56) References Cited

U.S. PATENT DOCUMENTS

| | | | |
|---|---|---|---|
| 11,785,323 B1* | 10/2023 | Kwak | H04N 23/55 |
| | | | 348/374 |
| 2017/0242852 A1* | 8/2017 | Clain | G06F 40/174 |
| 2023/0268774 A1* | 8/2023 | Kaiwa | H02M 3/33571 |
| | | | 307/104 |
| 2023/0268776 A1* | 8/2023 | Nagai | H04B 5/0037 |
| | | | 320/108 |
| 2023/0318173 A1* | 10/2023 | Oh | H01Q 1/526 |
| | | | 343/841 |

* cited by examiner

FIG. 15

|  | MAGNETIC SHEET | COMMUNICATION ANTENNA [nH] | RECEIVING COIL [nH] | k12 |
|---|---|---|---|---|
| (A) | NONE | 1126 | 753 | 0.067 |
|  | X-ER-88 | 1138 | 939 | 0.06 |
|  | ED-70 | 1121 | 881 | 0.063 |
|  | EH-66 | 1131 | 966 | 0.061 |
| (B) | NONE | 1126 | 400 | 0.0037 |
|  | X-ER-88 | 1130 | 528 | 0.003 |
|  | ED-70 | 1134 | 499 | 0.0032 |
|  | EH-66 | 1131 | 551 | 0.0029 |
| (C) | NONE | 1126 | 580 | 0.0037 |
|  | X-ER-88 | 1129 | 749 | 0.003 |
|  | ED-70 | 1135 | 711 | 0.0031 |
|  | EH-66 | 1132 | 780 | 0.0029 |

ELECTRONIC CARD WITH BIOMETRIC AUTHENTICATION FUNCTION

CROSS-REFERENCE TO RELATED APPLICATIONS

This application claims benefit of priority to International Patent Application No. PCT/JP2021/004029, filed Feb. 4, 2021, and to Japanese Patent Application No. 2020-098102, filed Jun. 5, 2020, the entire contents of each are incorporated herein by reference.

BACKGROUND

Technical Field

The present disclosure relates to an electronic card with biometric authentication function including a biometric sensor and a biometric authentication circuit.

Background Art

Electronic cards with biometric authentication function including a biometric sensor and a biometric authentication circuit are required to wirelessly perform authentication data communication in such a manner as to be held out over a reader-writer apparatus to wirelessly receive power.

In an example of apparatuses that wirelessly perform communication and power receiving, Japanese Patent No. 5013019 discloses a non-contact charging module including a non-contact charging coil, an NFC antenna, and magnetic sheets and capable of performing communication and power receiving. Japanese Patent No. 5013019 describes the non-contact charging module including the charging coil, the NFC coil disposed in such a manner as to surround the charging coil, a first magnetic sheet that supports the charging coil, and a second magnetic sheet that is disposed on the first magnetic sheet and that supports the NFC coil.

SUMMARY

In the non-contact charging module described in Japanese Patent No. 5013019, the charging coil and the NFC coil are configured to act as independent coils, and thus it is not possible to perform the communication and the power receiving at the same time. In addition, it is not possible to increase both of a communication efficiency and a power receiving efficiency.

Accordingly, the present disclosure provides an electronic card with biometric authentication function capable of performing communication and power receiving at the same time and having a communication efficiency and a power receiving efficiency that are both high.

An electronic card with biometric authentication function taken as an example of the present disclosure includes a communication antenna for short-range wireless communication; a wireless communication IC electrically connected to the communication antenna; a receiving coil magnetically coupled with the communication antenna; a resonant capacitor forming a receiving resonant circuit together with the receiving coil; a rectifying and smoothing circuit connected to the receiving resonant circuit; and a biometric sensor and a biometric authentication circuit that operate by using power caused by the receiving coil. The communication antenna and the receiving coil respond to a magnetic field in the same frequency band for the short-range wireless communication. The wireless communication IC performs short-range wireless communication. The receiving coil receives power from the magnetic field in the same frequency band for the short-range wireless communication. The biometric authentication circuit causes the biometric sensor to operate by using the power received from the receiving resonant circuit. The communication antenna and the receiving coil share electromagnetic field energy resonating in the same frequency band for the short-range wireless communication, the electromagnetic field energy being shared because of magnetic coupling between the communication antenna and the receiving coil.

With the configuration above, the communication antenna and the receiving coil respond to the magnetic field in the same frequency band for the short-range wireless communication, the receiving coil receives the power from the magnetic field in the same frequency band, and the communication antenna and the receiving coil share the electromagnetic field energy resonating in the frequency band for the short-range wireless communication, the electromagnetic field energy being shared because of the magnetic coupling between the communication antenna and the receiving coil.

According to the present disclosure, the communication and the power receiving can be performed at the same time, and an electronic card with biometric authentication function having a communication efficiency and power receiving efficiency that are both high can be obtained.

BRIEF DESCRIPTION OF THE DRAWINGS

FIG. 15 is a table illustrating relationships among the inductance of the communication antenna, the inductance of the receiving coil, and the coefficient of coupling between the communication antenna and the receiving coil in the configurations illustrated in FIG. 14A, FIG. 14B, and FIG. 14C;

DETAILED DESCRIPTION

Figure 1A:
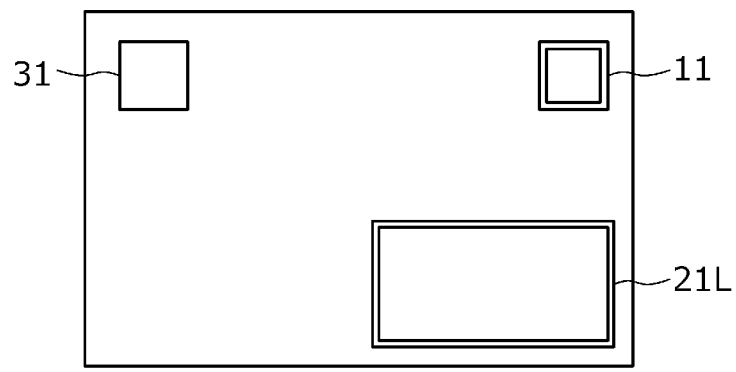
FIG. 1A and FIG. 1B are each a view illustrating an example arrangement of a communication antenna, a receiving coil, and a biometric authentication circuit in an electronic card with biometric authentication function according to a first embodiment.

Hereinafter, a plurality of modes for implementing the present disclosure will be described with specific examples with reference to the drawings. The same parts in the drawings are denoted by the same reference numerals. For convenience of explanation, an embodiment is divided into a plurality of embodiments in consideration of the explanation of the gist and easy understanding; however, each of configurations of respective different embodiments may be partially replaced or combined with a different one of the configurations. In and after a second embodiment, description of matters common to those in a first embodiment is omitted, and only different points are described. In particular, the same operations and effects of the same configuration are not referred to one by one for each embodiment.

First Embodiment

FIG. 1A, FIG. 1B, FIG. 2, and FIG. 3 are each a view illustrating an example arrangement of a communication antenna, a receiving coil, and a biometric authentication circuit in an electronic card with biometric authentication function according to the first embodiment.

Figure 1B:
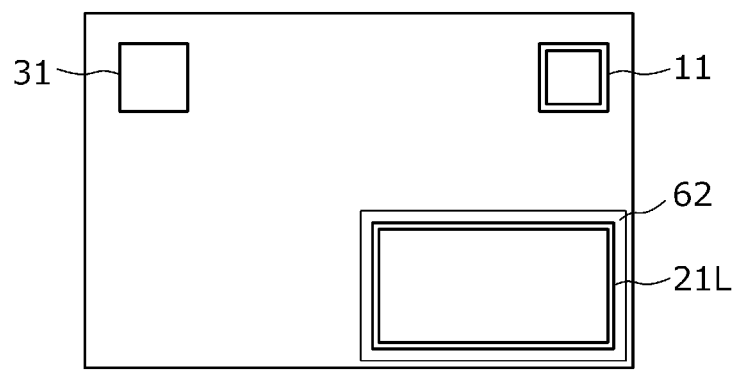
Figure 2:
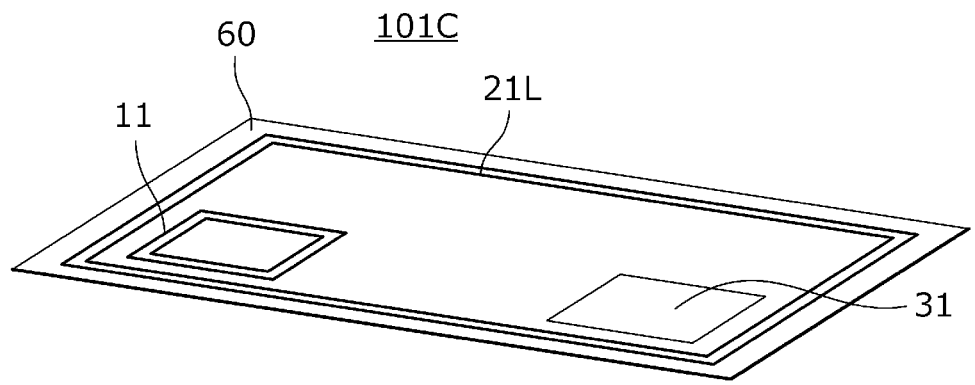
FIG. 2 is a view illustrating another example arrangement of the communication antenna, the receiving coil, and the biometric authentication circuit in an electronic card with biometric authentication function according to the first embodiment.
Figure 3:
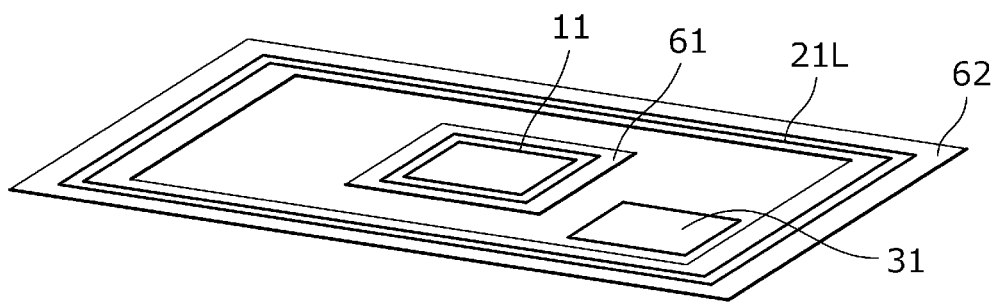
FIG. 3 is a view illustrating still another example arrangement of the communication antenna, the receiving coil, and the biometric authentication circuit in an electronic card with biometric authentication function according to the first embodiment.

An electronic card with biometric authentication function 101A illustrated in FIG. 1A, an electronic card with biometric authentication function 101B illustrated in FIG. 1B, an electronic card with biometric authentication function 101C illustrated in FIG. 2, and an electronic card with biometric authentication function 101D illustrated in FIG. 3 each include a communication antenna 11, a receiving coil 21L, and a biometric sensor 31. The communication antenna 11 and the receiving coil 21L are located on the same plane. In addition, the communication antenna 11 and the receiving coil 21L are disposed in a relationship in which part of the sides of the communication antenna 11 is parallel to part of the sides of the receiving coil 21L.

The communication antenna 11 is magnetically coupled with, for example, the communication antenna of a near field communication (NFC) reader-writer. The receiving coil 21L is magnetically coupled with the transmitting coil of a power transmission apparatus and a coil of an NFC apparatus. The biometric sensor 31 is, for example, a fingerprint sensor and detects a fingerprint of a user holding the electronic card with biometric authentication function 101A, 101B, 101C, or 101D.

In the electronic cards with biometric authentication function 101A and 101B, the communication antenna 11 and the receiving coil 21L are disposed to have respective independent coil apertures. The electronic card with biometric authentication function 101A does not include a magnetic sheet, but the electronic card with biometric authentication function 101B includes a magnetic sheet 62 in a location overlapping with the receiving coil 21L. A counterpart coil to be coupled with the receiving coil 21L is located in front of the electronic card with biometric authentication function 101A or 101B oriented as illustrated in FIG. 1A or FIG. 1B, and the magnetic sheet 62 acts as a magnetic path of a magnetic flux interlinking with the coil aperture of the receiving coil 21L.

In the electronic card with biometric authentication function 101C, the communication antenna 11 and the biometric sensor 31 are located inside the coil aperture of the receiving coil 21L. In addition, a magnetic sheet 60 overlapping with the entire receiving coil 21L is disposed. That is, the electronic card with biometric authentication function 101C has the shared magnetic sheet 60 forming part of the magnetic path of the communication antenna 11 and the receiving coil 21L. The configuration helps to appropriately define a coefficient of coupling between the communication antenna 11 and the receiving coil 21L.

In the electronic card with biometric authentication function 101D, the communication antenna 11 and the biometric sensor 31 are located inside the coil aperture of the receiving coil 21L. In addition, a magnetic sheet 61 overlapping with the communication antenna 11 and the magnetic sheet 62 disposed to follow the receiving coil 21L are provided.

In each of the electronic cards with biometric authentication function 101A, 101B, 101C, and 101D described above, the communication antenna 11 and the receiving coil 21L are magnetically coupled with each other and each of the electronic cards with biometric authentication function 101A, 101B, 101C, and 101D operates in an NFC frequency band.

Figure 4:
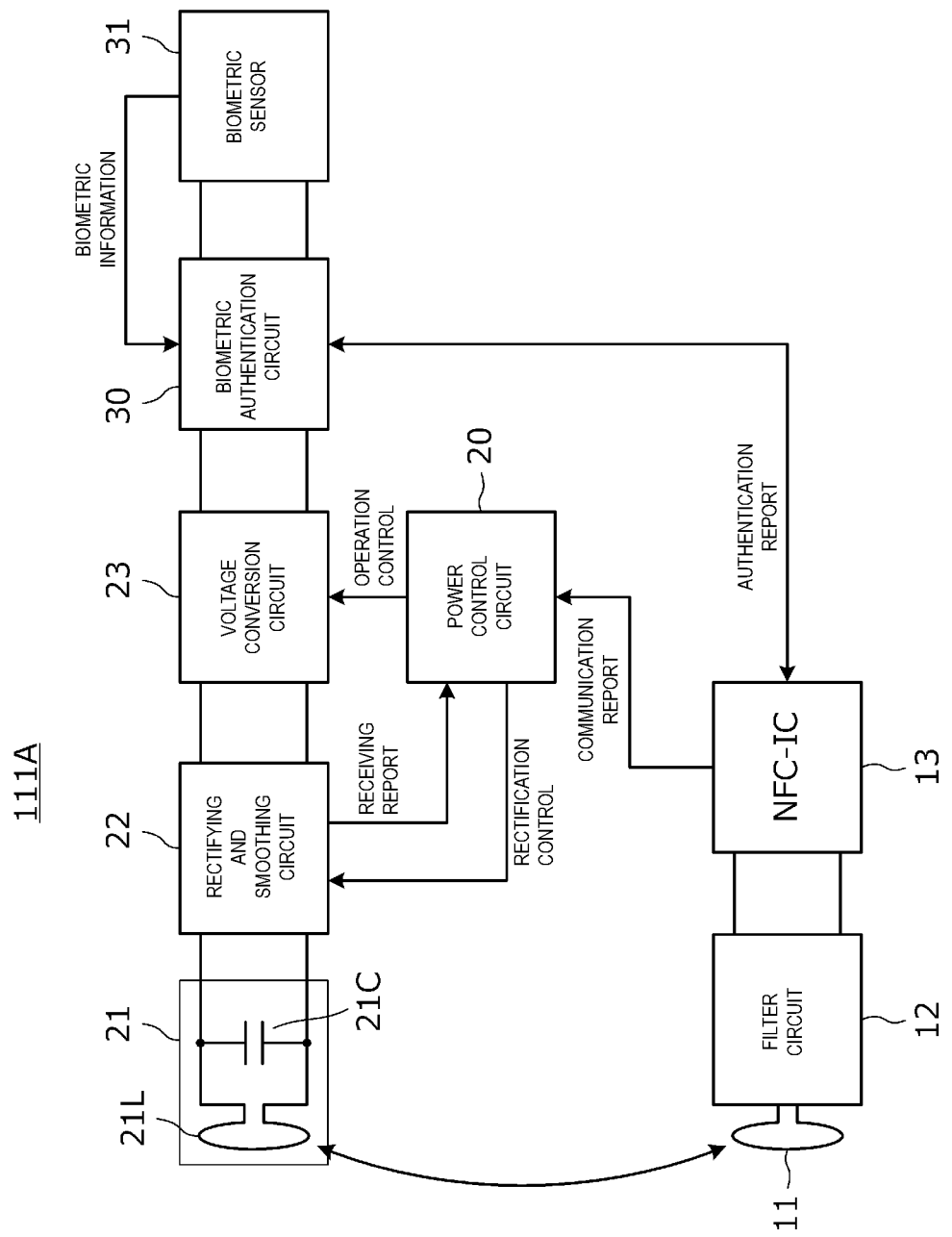
FIG. 4 is a block diagram illustrating the circuit configuration of an electronic card with biometric authentication function according to the first embodiment.

FIG. 4 is a block diagram illustrating the circuit configuration of an electronic card with biometric authentication function 111A according to the first embodiment.

The electronic card with biometric authentication function 111A includes the communication antenna 11 for NFC, a NFC-IC 13 electrically connected to the communication antenna 11, the receiving coil 21L magnetically coupled with the communication antenna 11, a resonant capacitor 21C forming a receiving resonant circuit 21 together with the receiving coil 21L, a rectifying and smoothing circuit 22 connected to the receiving resonant circuit 21, and the biometric sensor 31 and a biometric authentication circuit 30 that operate by using power from the receiving coil 21L. The electronic card with biometric authentication function 111A further includes a power control circuit 20. The NFC described above corresponds to "short-range wireless communication" according to the present disclosure. In addition, the NFC-IC described above corresponds to a "wireless communication IC" according to the present disclosure.

The electronic card with biometric authentication function 111A is used in such a manner as to be held out over the NFC reader-writer or a direct-current resonant power-transmission apparatus. The frequency band for NFC is a frequency band that is an industrial science and medical band (ISM band) such as a 6.78 MHz band or a 13.56 MHz band, or a frequency band that is a 2.4 GHz band, a 5.7 GHz band, or a 920 MHz band.

The communication antenna 11 and the receiving coil 21L respond in the same frequency band for the NFC. The NFC-IC 13 performs NFC communication. The receiving coil 21L receives power of a signal for the NFC communication. After the NFC-IC 13 is activated, the biometric authentication circuit 30 causes the biometric sensor 31 to operate by using the power received by the receiving coil 21L. The communication antenna 11 and the receiving coil 21L share electromagnetic field energy that resonates in the NFC communication frequency band, the electromagnetic field energy being shared because of magnetic coupling between the communication antenna 11 and the receiving coil 21L.

The power control circuit 20 receives, from the rectifying and smoothing circuit 22, a power receiving report signal indicating whether power is received and controls rectification of the rectifying and smoothing circuit 22. The biometric authentication circuit 30 and the NFC-IC 13 perform reporting regarding authentication.

In the example illustrated in FIG. 4, a filter circuit 12 is disposed between the communication antenna 11 and the NFC-IC 13. The filter circuit 12 is a circuit for increasing input impedance observed from the communication antenna 11 to reduce magnetic noise in communication. If the input impedance observed from the communication antenna 11 is high, the electromagnetic field energy obtained by the communication antenna 11 is largely attenuated, and thus the electromagnetic field energy obtained by the communication antenna 11 is difficult to use as power. In contrast, the receiving coil 21L is electrically connected to the resonant capacitor 21C and included in the receiving resonant circuit 21, and input impedance observed from the receiving coil 21L is designed to be low and thus is low. Accordingly, the electromagnetic field energy obtained by the receiving coil 21L is attenuated slightly, and the electromagnetic field energy obtained by the receiving coil 21L can be used as power. In addition, the communication antenna 11 and the receiving coil 21L are magnetically coupled with each other and thus can share the electromagnetic field energy, and both of a communication efficiency using the communication antenna 11 and a power receiving efficiency using the receiving coil 21L can be increased at the same time.

Figure 5:
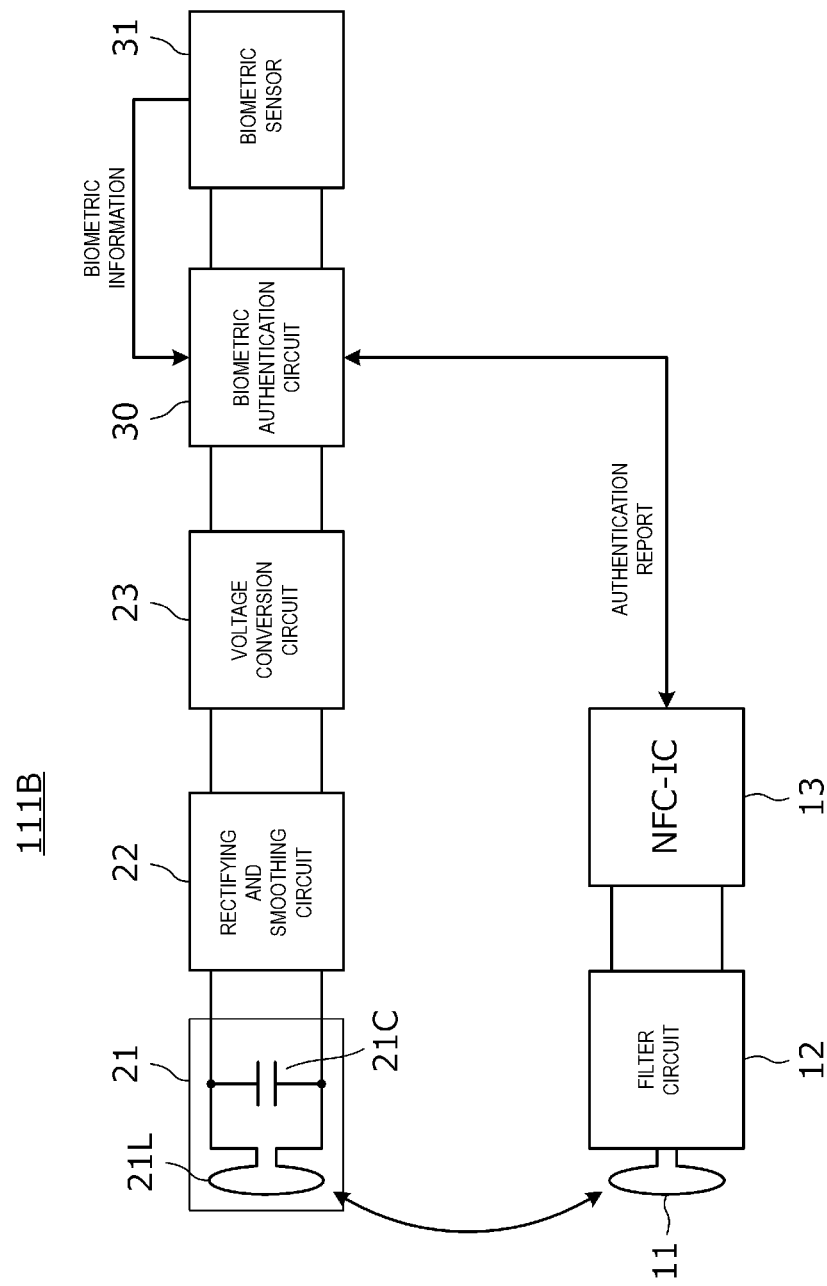
FIG. 5 is a block diagram illustrating the circuit configuration of a different electronic card with biometric authentication function according to the first embodiment.

FIG. 5 is a block diagram illustrating the circuit configuration of a different electronic card with biometric authentication function 111B according to the first embodiment.

In the electronic card with biometric authentication function 111B, the rectifying and smoothing circuit 22 and a voltage conversion circuit 23 are configured to be in an operable state at any time as long as power is received. The configuration except the above is the same as that of the electronic card with biometric authentication function 111A.

Figure 6:
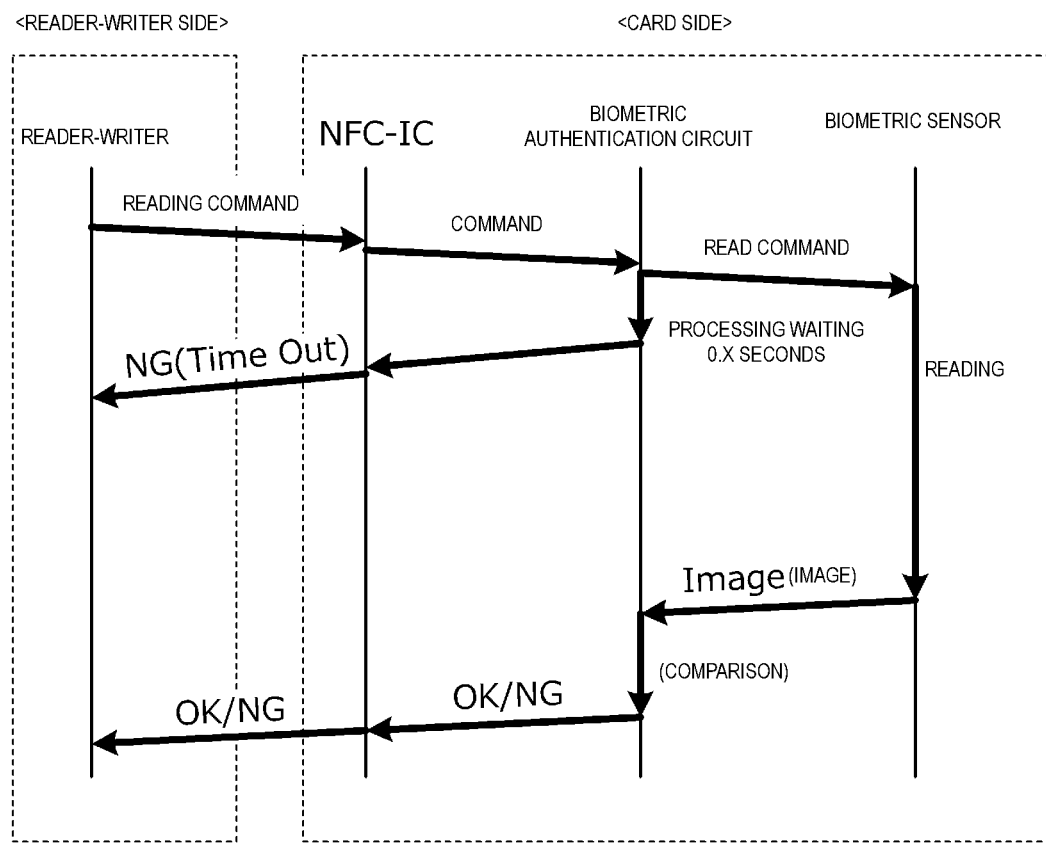
FIG. 6 is a diagram illustrating the operation sequence of the electronic cards with biometric authentication function.

FIG. 6 is a diagram illustrating the operation sequence of the electronic cards with biometric authentication function 111A and 111B described above. First, the reader-writer issues a reading command. The NFC-IC 13 of the electronic card with biometric authentication function receives the reading command and issues a command for biometric authentication to the biometric authentication circuit 30. The biometric authentication circuit 30 thus issues a READ command to the biometric sensor 31 and receives image information serving as the biometric information from the biometric sensor 31. The biometric authentication circuit 30 checks whether the biometric information comes from the user themselves and returns a result indicating OK or NG to the NFC-IC 13. The NFC-IC 13 returns the authentication result to the reader-writer.

If the receiving of power required to operate the biometric sensor 31 has failed, the biometric authentication circuit 30 returns NG (time out) to the NFC-IC 13. The NFC-IC 13 thus returns NG (time out) to the reader-writer.

As described above, the communication antenna 11 and the receiving coil 21L respond to the same frequency band for NFC, the receiving coil 21L receives power of a NFC signal, and the communication antenna 11 and the receiving coil 21L share the electromagnetic field energy resonating in the NFC frequency band, the electromagnetic field energy being shared because of the magnetic coupling between the communication antenna 11 and the receiving coil 21L. As described above, according to the present disclosure, the electronic card with biometric authentication function capable of performing the communication and the power receiving at the same time and having the communication efficiency and the power receiving efficiency that are both high can be obtained.

Second Embodiment

In the second embodiment, an electronic card with biometric authentication function including an electric storage device will be exemplified.

Figure 7:
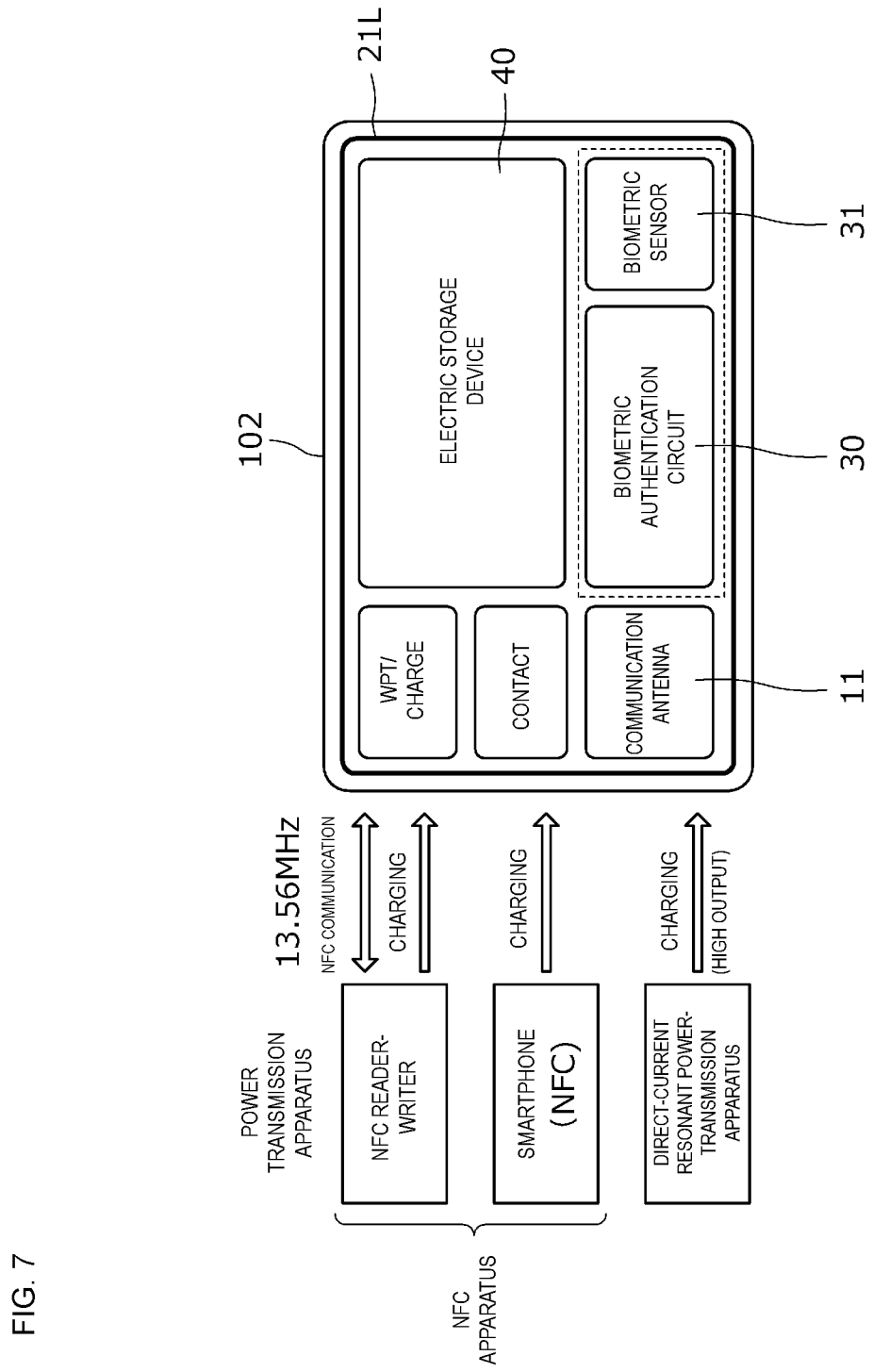
FIG. 7 is a view illustrating the configuration of an electronic card with biometric authentication function according to a second embodiment and a power transmission apparatus.

FIG. 7 is a view illustrating the configuration of an electronic card with biometric authentication function 102 according to the second embodiment and a power transmission apparatus. The electronic card with biometric authentication function 102 includes the communication antenna 11, the receiving coil 21L, the biometric authentication circuit 30, the biometric sensor 31, and a wireless power transfer (WPT)/charge circuit. The "contact" in the figure is a metal terminal connector. The electronic card with biometric authentication function 102 is a contactless card (a card to be held out over the reader-writer, the power transmission apparatus, or the like) but is also capable of contact communication through this contact.

The power transmission apparatus includes a NFC reader-writer, a smartphone having a NFC function, a direct-current resonant power-transmission apparatus, and the like. The receiving coil 21L is magnetically coupled with the antenna of any of these communication apparatuses or the coil of the power transmission apparatus and thereby receives power.

Figure 8:
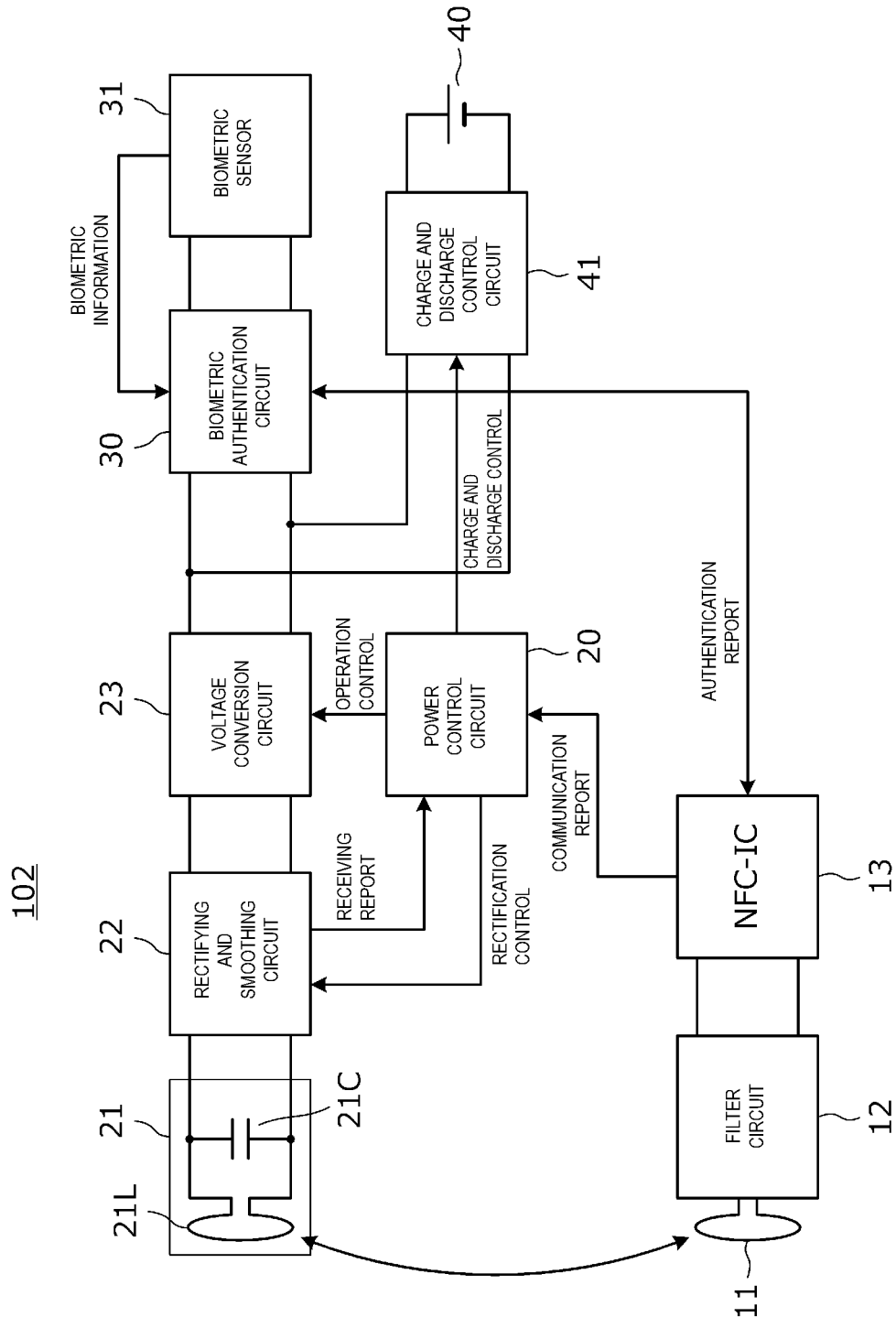
FIG. 8 is a block diagram illustrating the circuit configuration of the electronic card with biometric authentication function according to the second embodiment.

FIG. 8 is a block diagram illustrating the circuit configuration of the electronic card with biometric authentication function 102 according to the second embodiment. The electronic card with biometric authentication function 102 includes an electric storage device 40 and a charge and discharge control circuit 41. The charge and discharge control circuit 41 receives the output voltage of the voltage conversion circuit 23 and controls the charging and discharging of the electric storage device 40. The power control circuit 20 supplies the charge and discharge control circuit 41 with a control signal for the charging and discharging.

The configuration except the above is the same as that of the electronic card with biometric authentication function 111A illustrated in FIG. 4.

The biometric authentication circuit 30 and the biometric sensor 31 operate by using the output voltage of the voltage conversion circuit 23 or the discharge output voltage of the charge and discharge control circuit 41.

After the NFC-IC 13 is activated, the biometric authentication circuit 30 causes the biometric sensor 31 to operate by using the power received by the receiving coil 21L. Alternatively, after the NFC-IC 13 is activated, the biometric authentication circuit 30 causes the biometric sensor 31 to operate by using power from the electric storage device 40.

In response to receiving the power receiving report from the rectifying and smoothing circuit 22, the power control circuit 20 enables the charge and discharge control circuit 41. If the output voltage of the voltage conversion circuit 23 does not reach a voltage required to charge the electric storage device 40, the charge and discharge control circuit 41 supplies the biometric authentication circuit 30 with power of the electric storage device 40.

If the power control circuit 20 detects the end of the operation of the biometric authentication circuit 30, the power control circuit 20 outputs a control signal for charging to the charge and discharge control circuit 41. If the output voltage of the voltage conversion circuit 23 exceeds the voltage required to charge the electric storage device 40, the charge and discharge control circuit 41 thereby charges the electric storage device 40. The end of the operation of the biometric authentication circuit 30 above is detected based on, for example, a communication report signal from the NFC-IC 13. In addition to this, the end of the operation of the biometric authentication circuit 30 may be detected based on the detection of a signal from one of the components, the detection of the state of the component, the detection of the processing time of the component, or the like.

As described above, after the end of the operation of the biometric authentication circuit 30, the power control circuit 20 controls the charge and discharge control circuit 41 and thereby causes the power received by the receiving coil 21L to be stored in the electric storage device 40.

According to this embodiment, the electric storage device 40 can be charged by using power received from the NFC reader-writer or the smartphone each of which is illustrated in FIG. 7. Even if the power received from the NFC reader-writer or the smartphone is low, the biometric authentication can be performed.

Third Embodiment

In a third embodiment, magnetic coupling between a receiving coil and a communication antenna will be described.

Figure 9A:
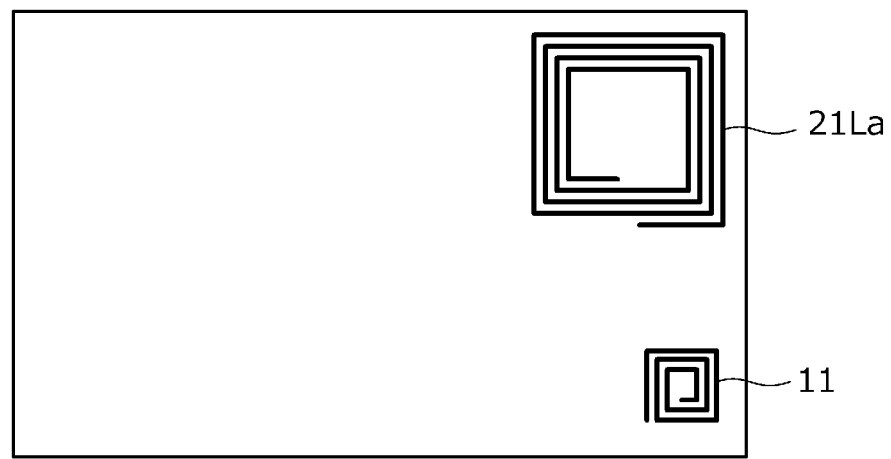
FIG. 9A and FIG. 9B are each a view illustrating the configuration of a communication antenna and receiving coils, the configuration being for simulating a relationship between a positional relationship between the communication antenna and a corresponding one of the receiving coils and a coefficient of coupling between the communication antenna and the receiving coil.
Figure 9B:
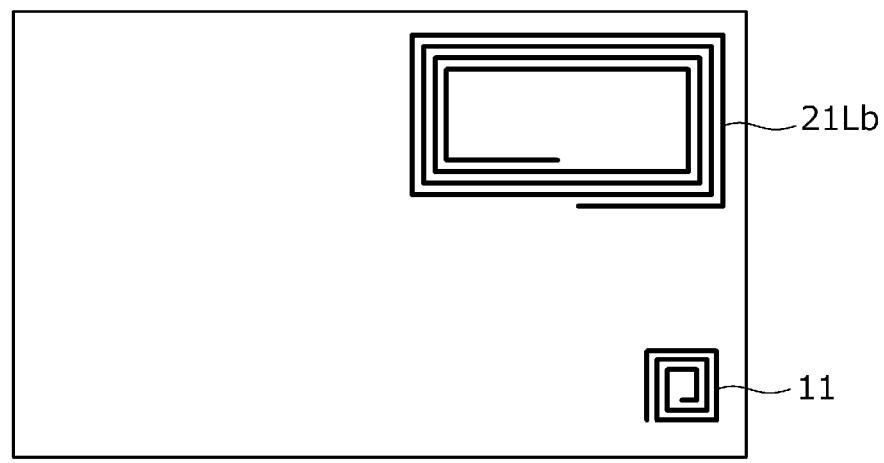

FIG. 9A and FIG. 9B are each a view illustrating the configuration of the communication antenna 11 and receiving coils 21La and 21Lb, the configuration being for simulating a relationship between a positional relationship between the communication antenna 11 and a corresponding one of the receiving coils 21La and 21Lb and a coefficient of coupling k12 between the communication antenna 11 and the receiving coil 21La or 21Lb. The specifications of the communication antenna 11 and the receiving coils 21La and 21Lb are as follows.

[Communication Antenna 11]
Outline: 8.4 mm×8.4 mm
Wiring width: 0.15 mm
Wiring pitch: 0.2 mm
The number of turns: 13
[Receiving Coil 21La]
Outline: 20 mm×20 mm
Wiring width: 0.8 mm
Wiring pitch: 1.2 mm
The number of turns: 4
[Receiving Coil 21Lb]
Outline: 18 mm×33 mm
Wiring width: 0.8 mm
Wiring pitch: 1.2 mm
The number of turns: 4

Figure 10A:
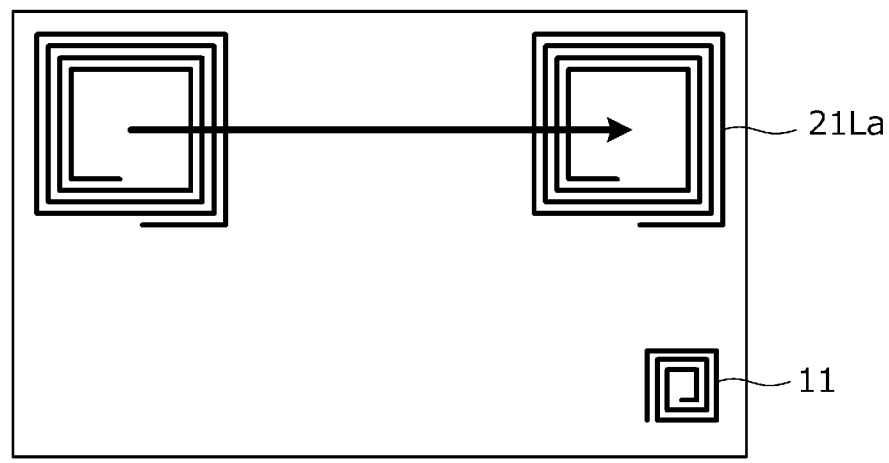
FIG. 10A and FIG. 10B are each a view illustrating change in the positional relationship between a corresponding one of the receiving coils and the communication antenna.
Figure 10B:
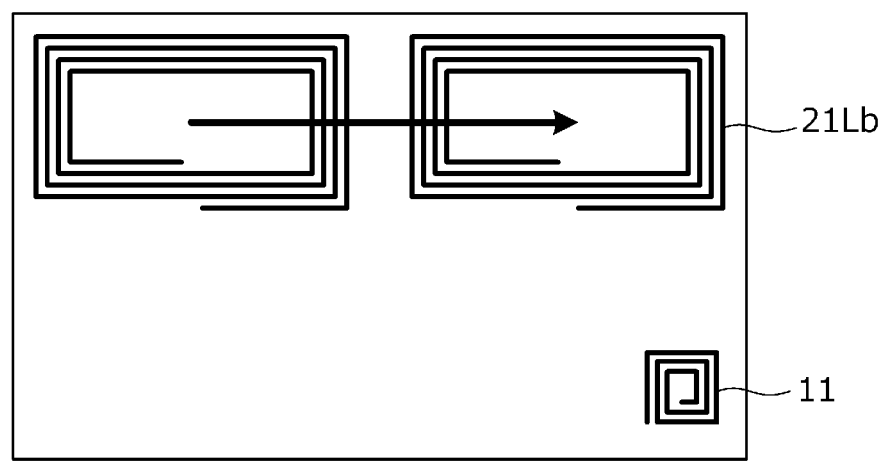

FIG. 10A and FIG. 10B are each a view illustrating change in the positional relationship between a corresponding one of the receiving coils 21La and 21Lb and the communication antenna 11. The coefficient of coupling k12 between the communication antenna 11 and each of the receiving coils 21La and 21Lb will be described below, the communication antenna 11 being disposed in the corner portion of a base material, the receiving coils 21La and 21Lb being moved from a corner portion of the base material to another corner portion, as illustrated in these figures.

Figure 11:
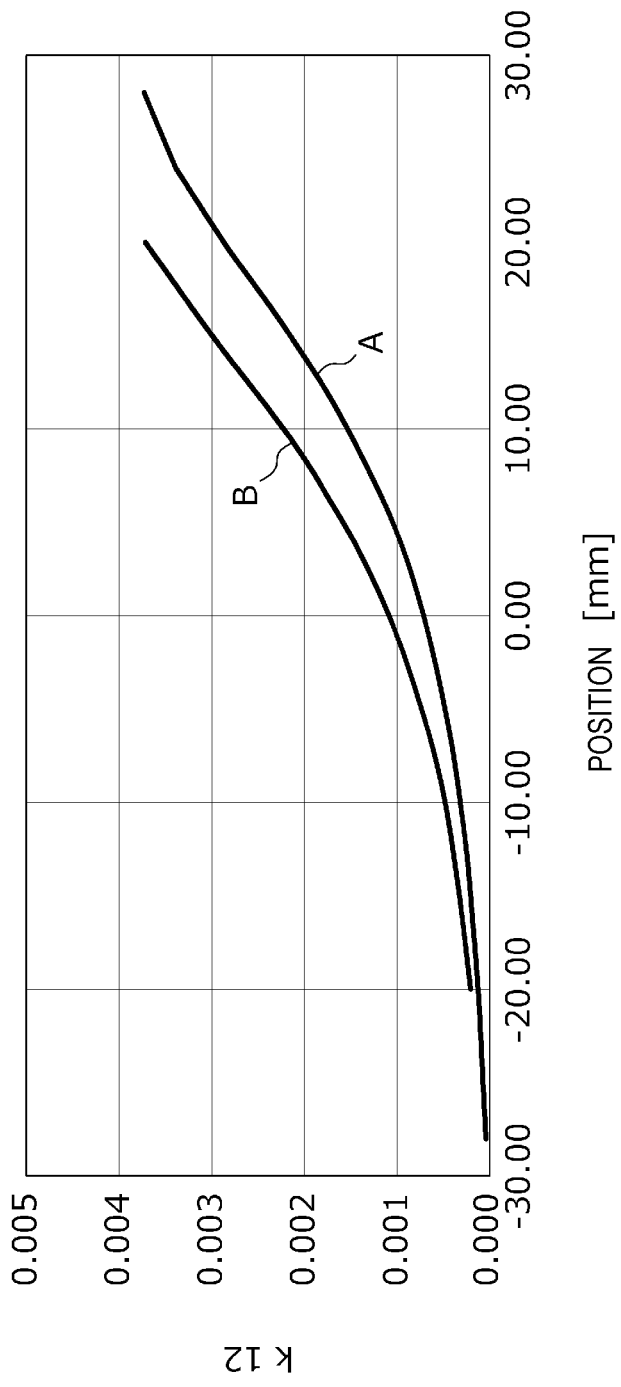
FIG. 11 is a graph illustrating each of relationships between the position of a corresponding one of the receiving coils and the change of the coefficient of coupling with the movement of the communication antenna illustrated in FIGS. 10A and 10B.

FIG. 11 is a graph illustrating each of relationships between the position of a corresponding one of the receiving coils 21La and 21Lb and the change of the coefficient of coupling k12 with the movement of the communication antenna 11 illustrated in FIGS. 10A and 10B. In FIG. 11, a curve A represents a characteristic in the case where the receiving coil 21La is provided, and a curve B represents a characteristic in the case where the receiving coil 21Lb is provided.

The coefficient of coupling k12 between the communication antenna 11 and each of the receiving coils 21La and 21Lb is decreased, as the receiving coils 21La and 21Lb become away from the communication antenna 11. In addition, on each of the base materials on which the communication antenna 11 and a corresponding one of the receiving coils 21La and 21Lb are disposed, disposing the communication antenna 11 and the receiving coil 21La or 21Lb in respective different corner portions of the base material causes the coefficient of coupling k12 to be low. To reduce electromagnetic interference between the communication antenna 11 and each of the receiving coils 21La and 21Lb, the communication antenna 11 and each of the receiving coils 21La and 21Lb preferably have a positional relationship causing the coefficient of coupling k12 to be low. For example, k12 is preferably within a range from 0.001 to 0.3.

Figure 12:
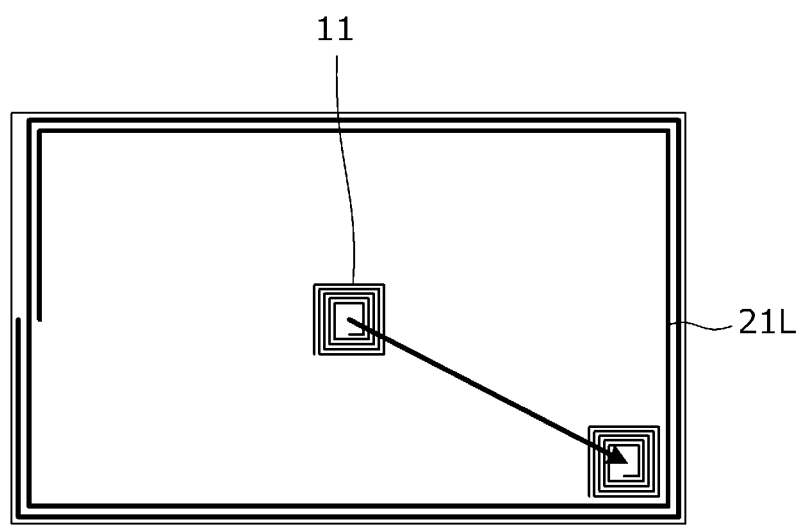
FIG. 12 is a view illustrating the position of the communication antenna in the electronic card with biometric authentication function with the communication antenna disposed in the coil aperture of a receiving coil.

FIG. 12 is a view illustrating the position of the communication antenna 11 in the electronic card with biometric authentication function with the communication antenna 11 disposed in the coil aperture of the receiving coil 21L. The specifications of the communication antenna 11 and the receiving coil 21L are as follows.

[Communication Antenna 11]
Outline: 8.4 mm×8.4 mm
Wiring width: 0.15 mm
Wiring pitch: 0.2 mm
The number of turns: 13
[Receiving Coil 21L]
Outline: 46 mm×77 mm
Wiring width: 0.8 mm
Wiring pitch: 1.2 mm
The number of turns: 2

Figure 13:
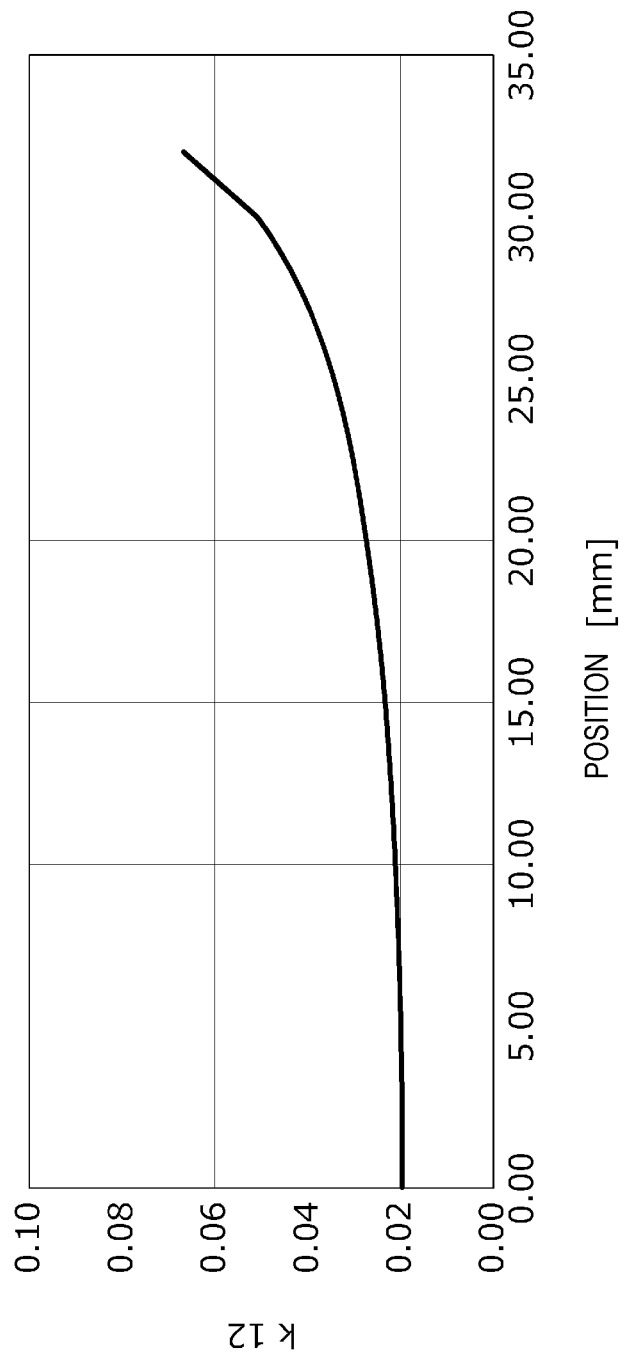
FIG. 13 is a graph illustrating the change of the coefficient of coupling with the movement of the communication antenna from the center of the receiving coil to a corner portion of the receiving coil along a diagonal line as illustrated in FIG. 12.

FIG. 13 is a graph illustrating the change of the coefficient of coupling k12 with the movement of the communication antenna 11 from the center of the receiving coil 21L to a corner portion of the receiving coil 21L along a diagonal line as illustrated in FIG. 12.

The coefficient of coupling k12 between the communication antenna 11 and the receiving coil 21L is higher in a location along beside a side of the receiving coil 21L than in the center of the receiving coil 21L. In particular, when the communication antenna 11 is located along beside a corner portion of the receiving coil 21L, the communication antenna 11 is close to two sides of the receiving coil 21L. Accordingly, as represented by FIG. 13, as the communication antenna 11 is close to the corner portion (sides), the coefficient of coupling k12 between the communication antenna 11 and the receiving coil 21L is increased sharply. To reduce electromagnetic interference between the communication antenna 11 and the receiving coil 21L, the communication antenna 11 and the receiving coil 21L preferably have the positional relationship causing the coefficient of coupling k12 to be low. For example, k12 is preferably within the range from 0.001 to 0.3, as described above.

Figure 14A:
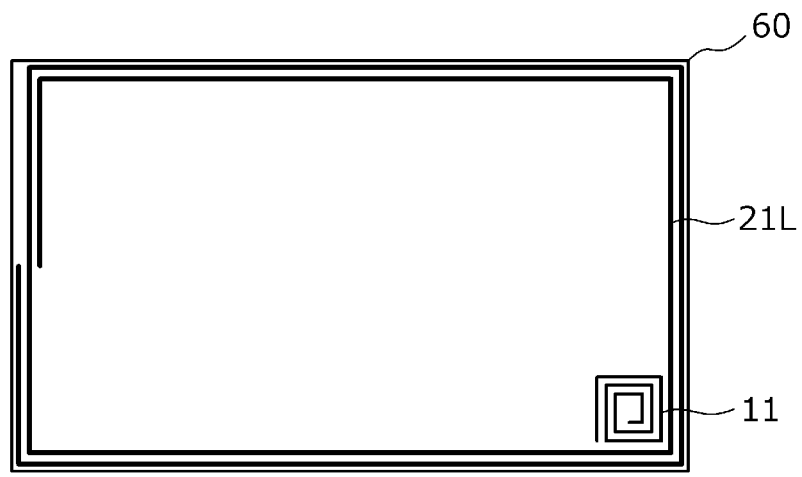
FIG. 14A, FIG. 14B, and FIG. 14C are each a view illustrating electromagnetic interference reduction using a magnetic sheet.
Figure 14B:
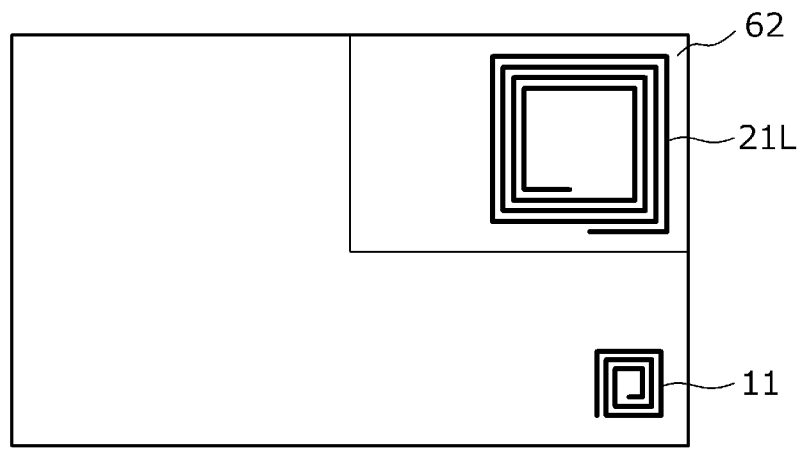
Figure 14C:
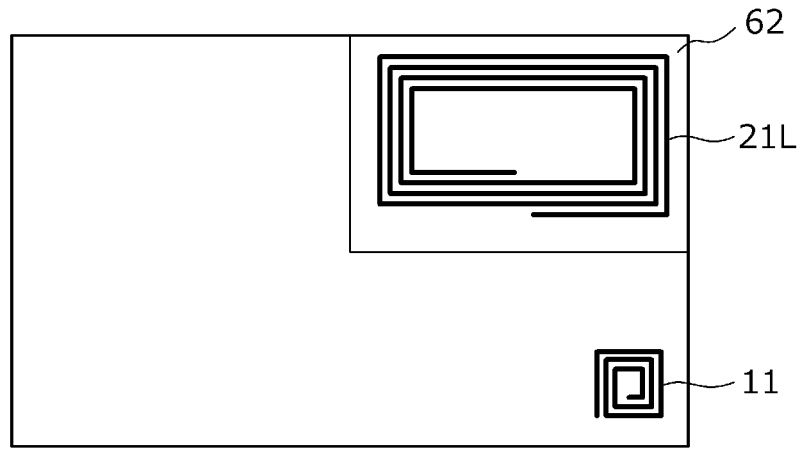

FIG. 14A, FIG. 14B, and FIG. 14C are each a view illustrating electromagnetic interference reduction using a magnetic sheet. In FIG. 14A, the communication antenna 11 is located inside the coil aperture of the receiving coil 21L, and the magnetic sheet 60 is disposed in such a manner as to overlap with the receiving coil 21L and the communication antenna 11 in a plan view. In FIG. 14B and FIG. 14C, the receiving coil 21L and the communication antenna 11 are disposed in parallel, and the magnetic sheet 62 overlapping with the receiving coil 21L is provided.

FIG. 15 is a table illustrating relationships among the inductance of the communication antenna 11, the inductance of the receiving coil 21L, and the coefficient of coupling k12 between the communication antenna 11 and the receiving coil 21L in the configurations illustrated in FIG. 14A, FIG. 14B, and FIG. 14C. The characteristics of the magnetic sheets are as follows.

*X-ER*-88: $\mu'=40$, $\mu''=0.9$(tan δ=0.0225)

*ED*-70: $\mu'=26$, $\mu''=0.6$(tan δ=0.023)

*EH*-66: $\mu'=52$, $\mu''=9.2$(tan δ=0.176)

As described above, the coefficient of coupling k12 between the communication antenna 11 and the receiving coil 21L can be controlled based on the specifications and the locations of the magnetic sheets 60 and 62. The electromagnetic interference between the communication antenna 11 and the receiving coil 21L can also be reduced.

Fourth Embodiment

In a fourth embodiment, an example circuit configuration of a direct-current resonant power-transmission apparatus and a power receiving part in the electronic card with biometric authentication function will be described.

Figure 16:
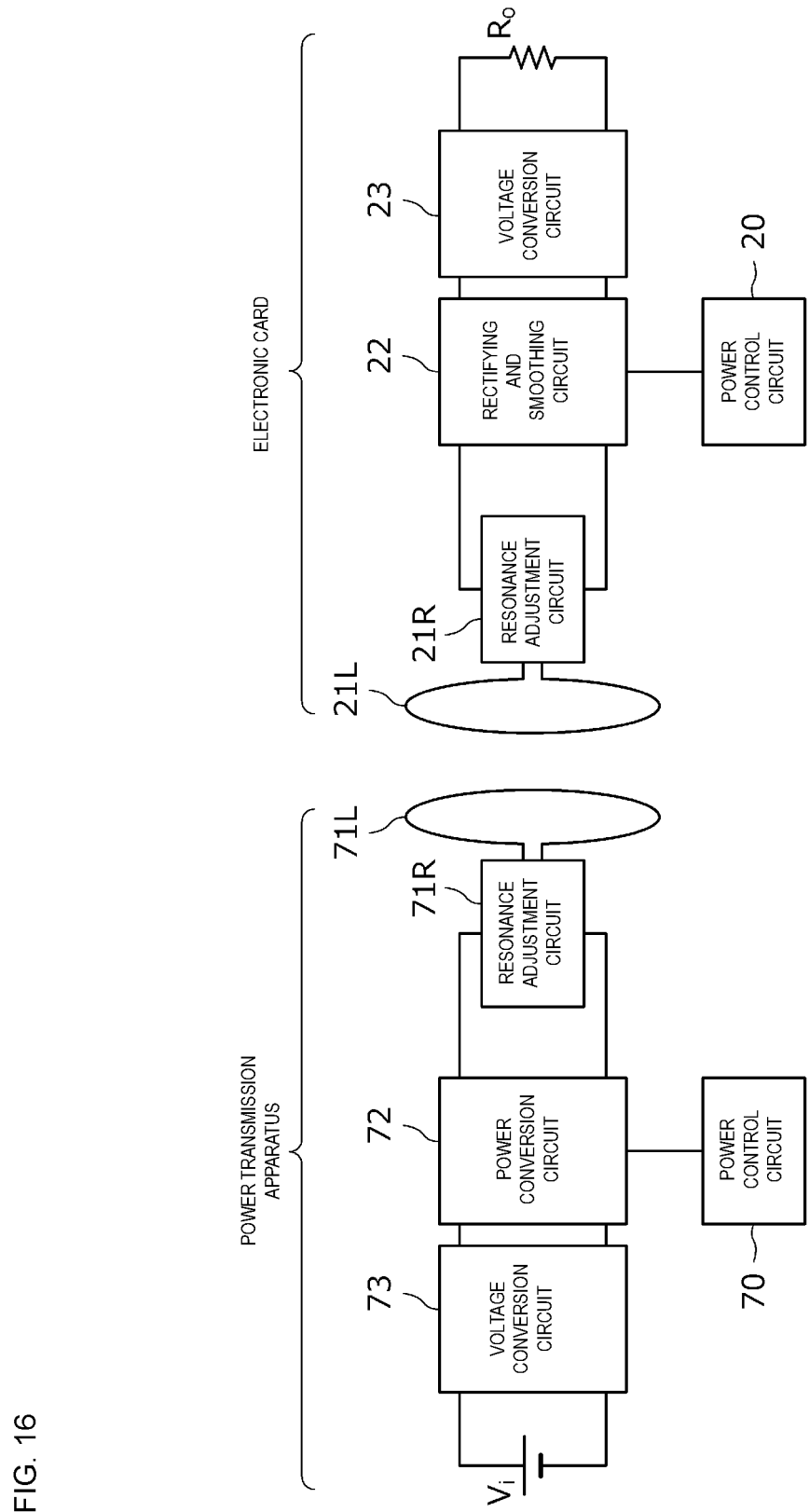
FIG. 16 is a diagram illustrating a circuit configuration according to a fourth embodiment of a direct-current resonant power-transmission apparatus and a power receiving part in an electronic card with biometric authentication function.
Figure 17:
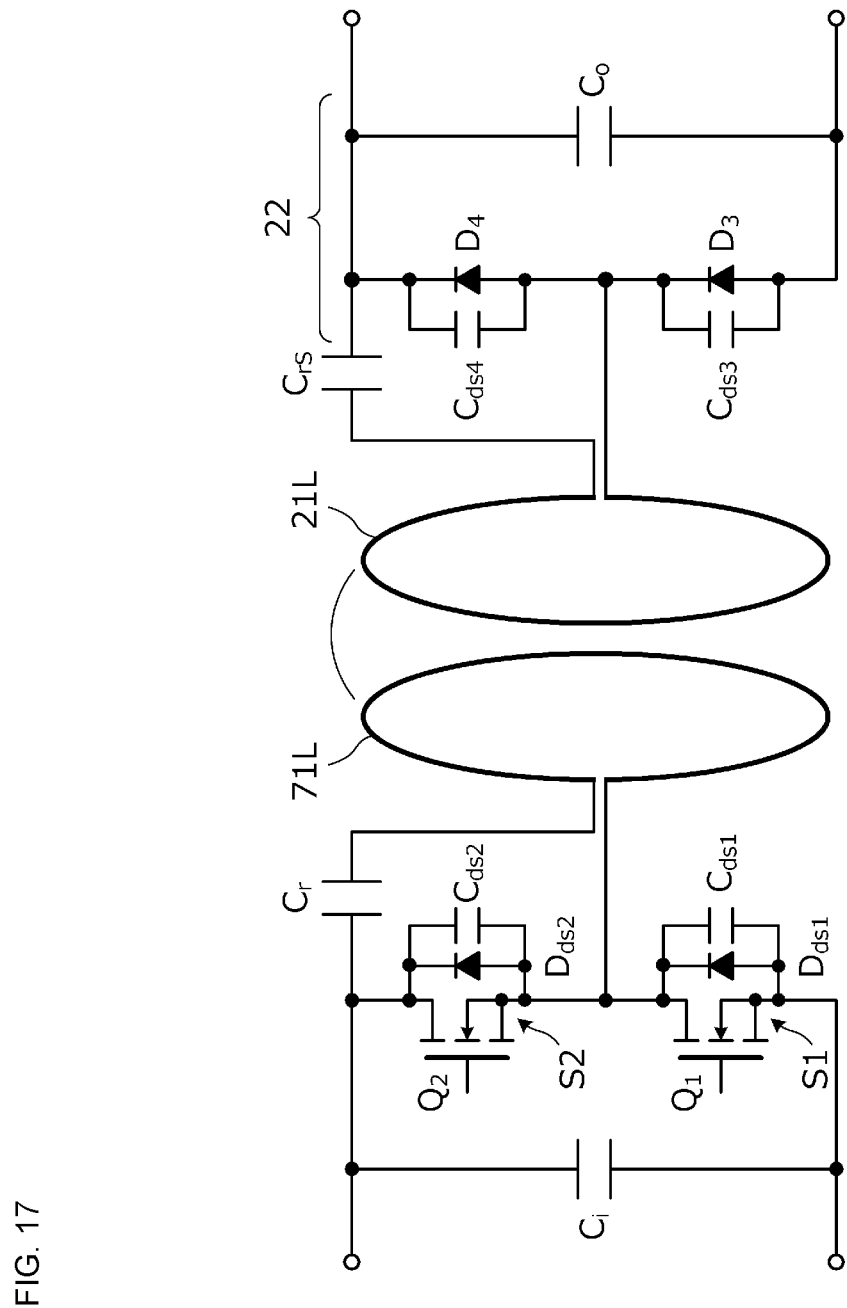
FIG. 17 is a diagram illustrating the circuit configuration of a power conversion circuit, resonance adjustment circuits, and a rectifying and smoothing circuit that are illustrated in FIG. 16.

FIG. 16 is a diagram illustrating a circuit configuration according to the fourth embodiment of a direct-current resonant power-transmission apparatus and a power receiving part in an electronic card with biometric authentication function. FIG. 17 is a diagram particularly illustrating the circuit configuration of a power conversion circuit 72, resonance adjustment circuits 71R and 21R, and the rectifying and smoothing circuit 22 that are illustrated in FIG. 16.

In FIG. 16, the power transmission apparatus includes a direct-current power supply Vi, a voltage conversion circuit 73 that converts the voltage of the direct-current power supply Vi, the power conversion circuit 72 that supplies alternating current power to a transmitting coil 71L and the resonance adjustment circuit 71R, and a power control circuit 70 for the components.

In FIG. 16, the electronic card with biometric authentication function includes the receiving coil 21L, the resonance adjustment circuit 21R, the rectifying and smoothing circuit 22, the voltage conversion circuit 23, and the power control circuit 20, as has been illustrated in FIG. 4 and the like. A resistor Ro is a load circuit for a biometric authentication circuit and the like.

The transmitting coil 71L and the resonance adjustment circuit 71R form a resonant circuit on the power transmitting side, the receiving coil 21L and the resonance adjustment circuit 21R form a resonant circuit on the power receiving side, and the resonant circuits form a resonant field.

In the example illustrated in FIG. 17, a first switch circuit S1, a second switch circuit S2, a switching control circuit, and a resonant capacitor Cr are provided. The first switch circuit S1 equivalently includes a first switching element Q1 and a parallel connection circuit composed of a diode Dds1 and a capacitor Cds1. The second switch circuit S2 equivalently includes a second switching element Q2 and a parallel connection circuit composed of a diode Dds2 and a capacitor Cds2. The switching control circuit is provided outside the figure and controls the switching elements Q1 and Q2. The resonant capacitor Cr is an example of the resonance adjustment circuit 71R illustrated in FIG. 16, and the transmitting coil 71L and the resonant capacitor Cr form a power-transmission resonant circuit.

The first switching element Q1 of the first switch circuit S1 and the second switching element Q2 of the second switch circuit S2 are turned on and off alternately.

The switching control circuit intermittently supplies a direct current voltage to the power-transmission resonant circuit by complementarily and alternately switching the first switching element Q1 and the second switching element Q2 at a predetermined operation frequency and thereby causes the transmitting coil 71L to generate resonance current. This causes a voltage between both ends of each of the first switch circuit S1 and the second switch circuit S2 to have a voltage waveform having a shape of a square wave or a trapezoidal wave. Specifically, switching operation is performed at 13.56 MHz used in the NFC communication.

A power receiving circuit in the electronic card with biometric authentication function includes the rectifying and smoothing circuit 22 and a receiving resonant circuit composed of the receiving coil 21L and a resonant capacitor Crs. The rectifying and smoothing circuit 22 includes a parallel connection circuit composed of a diode Dds3 and a capacitor Cds3 and a parallel connection circuit composed of a diode Dds4 and a capacitor Cds4.

The diodes Dds3 and Dds4 rectify a voltage generated in the receiving resonant circuit composed of the receiving coil 21L and the resonant capacitor Crs, and a capacitor Co smooths the voltage. In this example, the receiving coil 21L and the resonant capacitor Crs form the receiving resonant circuit. The aforementioned power-transmission resonant circuit and the receiving resonant circuit resonate.

As described above, wireless power supply using the direct current resonance enables the power transmission apparatus to wirelessly transmit high output power and thus enables the electronic card with biometric authentication function to receive high power. It is also possible to charge an electric storage device in a short time.

Lastly, the present disclosure is not limited to the embodiments described above. Modifications and changes may be made appropriately by those skilled in the art. The scope of the present disclosure is defined by the scope of claims, not by the embodiments above. Further, the scope of the present disclosure includes a modification and a change made from the embodiments in the scope equivalent to the scope of claims.

What is claimed is:

1. An electronic card with biometric authentication function comprising:
    a communication antenna for short-range wireless communication;
    a wireless communication IC electrically connected to the communication antenna and configured to perform short-range wireless communication;
    a receiving coil magnetically coupled with the communication antenna;
    a resonant capacitor configuring a receiving resonant circuit together with the receiving coil;
    a rectifying and smoothing circuit connected to the receiving resonant circuit; and
    a biometric sensor and a biometric authentication circuit configured to operate by using power caused by the receiving coil,
    wherein
    the communication antenna and the receiving coil are configured to respond to a magnetic field in a same frequency band for the short-range wireless communication,
    the receiving coil is configured to receive power from the magnetic field in a same frequency band for the short-range wireless communication,
    the biometric authentication circuit is configured to cause the biometric sensor to operate by using the power received from the receiving resonant circuit, and
    the communication antenna and the receiving coil are configured to share electromagnetic field energy resonating in the same frequency band for the short-range wireless communication, the electromagnetic field energy being shared because of magnetic coupling between the communication antenna and the receiving coil.

2. The electronic card with biometric authentication function according to claim 1, wherein the biometric sensor is a fingerprint sensor.

3. The electronic card with biometric authentication function according to claim 1, wherein
    the same frequency band for the short-range wireless communication is a frequency in an industrial science and medical (ISM) band.

4. The electronic card with biometric authentication function according to claim 1, wherein
    the same frequency band for the short-range wireless communication is a frequency in a 6.78 MHz band or a 13.56 MHz band.

5. The electronic card with biometric authentication function according to claim 1, wherein
    the communication antenna and the receiving coil are located on a same plane.

6. The electronic card with biometric authentication function according to claim 1, wherein
    a coupling coefficient of the magnetic coupling between the receiving coil and the communication antenna is defined based on arrangement and a structure of the communication antenna and the receiving coil.

7. The electronic card with biometric authentication function according to claim 6, wherein
    part of sides of the communication antenna and part of sides of the receiving coil are disposed in parallel.

8. The electronic card with biometric authentication function according to claim 6, wherein
    the coupling coefficient of the magnetic coupling is set within a range from 0.001 to 0.3.

9. The electronic card with biometric authentication function according to claim 1, further comprising:
    a shared magnetic sheet configuring part of a magnetic path of the communication antenna and the receiving coil.

10. The electronic card with biometric authentication function according to claim 1, further comprising:
    an electric storage device configured to store the power received by the receiving coil;
    a charge and discharge control circuit configured to control charging and discharging of the electric storage device; and
    a power control circuit configured to control the charge and discharge control circuit.

11. The electronic card with biometric authentication function according to claim 10, wherein
    after end of operation of the biometric authentication circuit, the power control circuit is configured to control the charge and discharge control circuit and causes the power received by the receiving coil to be stored in the electric storage device.

12. The electronic card with biometric authentication function according to claim 10, wherein
    after the wireless communication IC is activated, the biometric authentication circuit is configured to cause the biometric sensor to operate by using the power from the electric storage device.

13. The electronic card with biometric authentication function according to claim 1, wherein
    after the wireless communication IC is activated, the biometric authentication circuit is configured to cause the biometric sensor to operate by using the power received by the receiving coil.

14. The electronic card with biometric authentication function according to claim 2, wherein
    the same frequency band for the short-range wireless communication is a frequency in an industrial science and medical (ISM) band.

15. The electronic card with biometric authentication function according to claim 2, wherein
    the same frequency band for the short-range wireless communication is a frequency in a 6.78 MHz band or a 13.56 MHz band.

16. The electronic card with biometric authentication function according to claim 2, wherein
    the communication antenna and the receiving coil are located on a same plane.

17. The electronic card with biometric authentication function according to claim 2, wherein
    a coupling coefficient of the magnetic coupling between the receiving coil and the communication antenna is defined based on arrangement and a structure of the communication antenna and the receiving coil.

18. The electronic card with biometric authentication function according to claim 7, wherein
    the coupling coefficient of the magnetic coupling is set within a range from 0.001 to 0.3.

19. The electronic card with biometric authentication function according to claim 2, further comprising:

a shared magnetic sheet configuring part of a magnetic path of the communication antenna and the receiving coil.

20. The electronic card with biometric authentication function according to claim 2, further comprising:
   an electric storage device configured to store the power received by the receiving coil;
   a charge and discharge control circuit configured to control charging and discharging of the electric storage device; and
   a power control circuit configured to control the charge and discharge control circuit.

\* \* \* \* \*